United States Patent [19]

Katoh et al.

[11] Patent Number: 5,266,362

[45] Date of Patent: * Nov. 30, 1993

[54] SURFACE TREATING AND COATING METHOD FOR MOLDED ARTICLES

[75] Inventors: Kohichiroh Katoh, Abiko; Motomi Nogiwa, Zushi; Yoshiharu Iwasaki, Yokohama, all of Japan

[73] Assignees: Japan (Agency of Industrial Science and Technology); Nippon Petrochemicals Company, Limited, Tokyo, Japan

[*] Notice: The portion of the term of this patent subsequent to Jul. 21, 2009 has been disclaimed.

[21] Appl. No.: 752,541

[22] PCT Filed: Jan. 23, 1991

[86] PCT No.: PCT/JP91/00067

§ 371 Date: Nov. 22, 1991

§ 102(e) Date: Nov. 22, 1991

[87] PCT Pub. No.: WO91/11482

PCT Pub. Date: Aug. 8, 1991

[30] Foreign Application Priority Data

Jan. 23, 1990 [JP] Japan .................................. 2-11809

[51] Int. Cl.$^5$ .............................................. B29C 71/04
[52] U.S. Cl. ...................................... 427/553; 264/22; 264/349; 427/393.5; 427/421
[58] Field of Search ....................... 264/22, 25, 82, 83, 264/349, 171, 211; 427/35, 54.1, 40, 44, 553, 421, 393.5; 525/193, 194, 198, 240

[56] References Cited

U.S. PATENT DOCUMENTS

| | | | |
|---|---|---|---|
| 3,806,558 | 4/1974 | Fischer | 525/198 |
| 3,892,885 | 7/1975 | Bragole | 427/54.1 |
| 3,935,329 | 1/1976 | Reilly et al. | 427/54.1 |
| 4,024,317 | 5/1977 | Stoye et al. | 427/54.1 |
| 4,094,756 | 6/1978 | Taylor | 427/54.1 |
| 4,160,859 | 7/1979 | Renner et al. | 528/322 |
| 4,180,531 | 12/1979 | Alia | 525/194 |
| 4,724,057 | 2/1988 | Ebisawa et al. | 427/40 |
| 4,840,851 | 6/1989 | Golander et al. | 427/44 |
| 4,853,253 | 8/1989 | Katoh | 427/54.1 |
| 4,871,796 | 10/1989 | Komatsu et al. | 525/193 |
| 4,902,738 | 2/1990 | Mitsuno et al. | 525/194 |
| 5,026,608 | 6/1991 | Polato et al. | 427/54.1 |
| 5,077,082 | 12/1991 | Katoh et al. | 427/54.1 |
| 5,116,908 | 5/1992 | Inoue et al. | 525/193 |
| 5,132,131 | 7/1992 | Katoh et al. | 427/54.1 |

FOREIGN PATENT DOCUMENTS 54-57576 of 0000 Japan .

Primary Examiner—Jeffery Thurlow
Assistant Examiner—Mathieu Vargot
Attorney, Agent, or Firm—Scully, Scott, Murphy & Presser

[57] ABSTRACT

A molded article of a composition obtained by dynamically heat-treating a thermoplastic resin and/or a rubbery substance in the presence of a crosslinking agent, or such composition with an inorganic filler incorporated therein, is subjected to the radiation of ultraviolet light not longer than 300 nm in wave length, whereby surface characteristics of the molded article can be improved without deterioration of such characteristics as rigidity, impact- and heat-resistance, dimensional stability and processability.

7 Claims, No Drawings

SURFACE TREATING AND COATING METHOD FOR MOLDED ARTICLES

BACKGROUND OF THE INVENTION

The present invention relates to a surface treating and/or coating method for a molded article comprising a thermoplastic resin composition. More particularly, the present invention is concerned with a surface treating and/or coating method for a composition obtained by dynamically heat-treating a thermoplastic resin and/or a rubbery substance in the presence of a crosslinking agent, or a composition comprising the said composition and an inorganic filler incorporated therein, the said composition or the inorganic filler-incorporated composition being superior in the balance of rigidity, impact resistance, heat resistance, dimensional stability and moldability.

Heretofor, thermoplastic resins such as polyolefin resins, e.g. polyethylene and polypropylene, and polyester resins, have been used in various fields, including automobile parts, household electric products and electronic devices. In order to enhance the added value of these products there have been conducted surface coating, printing or plating, or lamination tehreto of non-woven fabric, foam or leather, or implantation of feathers therein. However, since polyolefin resins and polyester resins do not have a polar group, it is difficult to apply coating, bonding or printing thereto.

Generally, for the purpose of improving the coatability of the aforementioned products, there are conducted surface treatments such as a physical treatment, e.g. sandblasting, flame treating, corona discharge, or treatment using plasma, and a chemical treatment, e.g. treatment using chromic acid mixture or solvent.

However, such conventional physical treating methods involves the following problems: ① the effect is unsatisfactory, ② the treating speed is low and treating time long, ③ the apparatus is large-scaled and the process is complicated, and ④ the method is not economical.

The aforementioned chemical methods also involves problems; for example, ① environmental pollution, and ② considerable time, labor and cost are required for the disposal of liquid wastes used such as chemicals and solvents.

Both such conventional methods involve the problem that the coatability, printability and adhesive property in the use of coating material, ink and adhesive are still unsatisfactory.

SUMMARY OF THE INVENTION

The present invention has been accomplished in view of the above-mentioned points and it is the object of the invention to provide a surface treating and/or coating method for molded articles, extremely superior in coatability, printability and adhesive property, using a device of a simple structure.

Having made extensive studies for achieving the above-mentioned object, the present inventors found out a method capable of improving surface characteristics of molded articles. In this way we accomplished the present invention.

According to a first aspect of the present invention there is provided a surface treating and coating method for a molded article, characterized in that a molded article of a partially crosslinked, thermoplastic resin composition obtained by dynamically heat-treating (A) a thermoplastic resin and/or (B) a rubbery substance in the presence of (C) a crosslinking agent and, if desired, (D) a polyfunctional monomer is surface-treated by the radiation thereto of an ultraviolet light not longer than 300 nm in wave length and then coated.

According to a second aspect of the present invention there is provided a surface treating and coating method for a molded article, characterized in that a molded article of an inorganic filler-incorporated composition is surface-treated by the radiation thereto of an ultraviolet light not longer than 300 nm in wave length and then coated, the said inorganic filler-incorporated composition comprising 100 parts by weight of a partially crosslinked resin composition obtained by dynamically heat-treating (A) a thermoplastic resin and/or (B) a rubbery substance in the presence of (C) a crosslinking agent and, if desired, (D) a polyfunctional monomer, and (E) 1-200 parts by weight of an inorganic filler.

As examples of the thermoplastic resin (A) used in the present invention there are mentioned polyolefin resins such as $\alpha$-olefin (co)polymers having 2 to 10 carbon atoms, e.g. high and medium density polyethylenes, low density polyethylenes, linear low-density polyethylenes, very low density polyethylenes, polypropylenes, poly-1-butene, and poly-4-methyl-1-pentene, interpolymers of $\alpha$-olefins, e.g. ethylene, propylene, butene-1, hexene-1 and 4-methyl-1-pentene, and copolymers of ethylene and polar group-containing monomers, e.g. ethylene-unsaturated carboxylic acid ester copolymers and ethylene-carboxylic acid vinyl ester copolymers; polystyrene resins such as polystyrenes, styrene/acrylonitrile copolymer, styrene/methyl metacrylate/acrylonitrile copolymer, $\alpha$-methylstyrene/styrene/acrylonitrile copolymer, ABS, MBS, AES, and AAS; as well as polyacrylonitrile resins, polyvinyl chloride resins, polyvinylidene chloride resins, polymethacrylate resins, polyacetal resins, polyamide resins, polycarbonate resins, polyphenylene ether resins, polyester resins, polysulfone resins, polyether sulfone resins, polyphenylene sulfide resins, polyether ether ketones, polyacrylate resins, polyamide-imide resins, polyimide resins, and fluorine resins. These may be used each alone or as mixtures.

For example, in the case of polypropylenes, a combined use thereof with linear low-density polyethylenes or very low density polyethylenes will improve the balance of physical properties, so it is desirable to use at least two of them in combination.

The blending ratio is in the range of 95~5/5~95, preferably 90~10/10~90, in which range it is possible to satisfy a wide variety of requirements for physical properties in cooperation with the physical properties of the rubbery substance which will be described below.

As examples of the rubbery substance (B) used in the present invention there are mentioned ethylene-propylene random copolymer rubber, ethylene-propylene-diene random copolymer rubber, 1,2-polybutadiene, styrene-butadinene-styrene block copolymer rubber, styrene-isoprene-styrene block copolymer rubber, natural rubber, nitrile rubber, and isobutylene rubber. These may be used each alone or as mixtures. Particularly, ethylene-propylene random copolymer rubber and ethylene-propylene-diene random copolymer rubber are preferred.

As to the diene component in the ethylene-propylene-diene random copolymer rubber, any of conventional ones may be used, including ethylidene norbornene, 1,4-hexadiene and cyclopentadiene.

The blending ratio of the components (A) and (B) is in the range of 10~0/0~100, preferably 95~5/5~95, more preferably 90~10/10~90, as (A)/(B).

As the crosslinking agent (C) in the invention there is used at least one member selected from organic peroxides such as hydroperoxides, dialkylperoxides, diacylperoxides, peroxyesters, and ketone peroxides, dihydroaromatic compounds, and vulcanizing agents such as sulfur.

The dihydroaromatic compounds just referred to above indicate compounds containing one or more aromatic rings at least one of which is dihydrogenated. The aromatic ring as referred to herein indicates a ring structure wherein the number of $\pi$-electrons is $4n+2$ (n is an integer) which $\pi$-electrons are shown in the definition of aromaticity [see, for example, "Yuki Kagaku-no Kiso," translated by Toshio Goto, Tokyo Kagaku Donin (1976), pp. 105-106, (Richard S. Monson & John C. Shelton, "Fundamentals of Organic Chemistry," MacGraw-Hill, Inc. (1974)]. For example, pyridine and quinoline are included. Therefore, dihydro derivatives of quinoline are also included as examples of dihydroaromatic compounds empoyable in the invention. Further, the dihydroaromatic compounds employable in the invention may contain substituent groups. There may be used derivatives substituted with alkyl groups, various elements and functional groups.

Such dihydroaromatic compounds can be prepared by the application of known chemical reactions. Examples of those available at present include 1,2-dihydrobenzene, cis-1,2-dihydrocatechol, 1,2-dihydonaphthalene, 9,10-dihydrophenanthrene, as well as 1,2-dihydroquinoline compounds such as 6-decyl-2,2,4-trimethyl-1,2-dihydroquinoline, 6-ethoxy-2,2,4-trimethyl-1,2-dihydroquinoline, and 2,2,4-trimethyl-1,2-dihyroquinoline. Polymers of these compounds are also employable.

Is is persumed that the dihydroaromatic compounds act on the carbon-hydrogen bond of the thermoplastic resin to form carbon radical and per se exhibit a resonant structure after release of the radical and are stabilized.

As compared with oxygen radical formed by the cleavage of the foregoing organic peroxides, the carbon radical just referred to above is weak in the hydrogen withdrawing ability from the carbon-hydrogen bond, so does not exhibit an extreme degradation reaction even for a peroxide decomposing type thermoplastic resin such as polypropylene, nor does it exhibit an extreme crosslinking reaction even for a peroxide crosslinking type thermoplastic resin such as polyethylene. Therefore, the control of reaction is easy and it is possible to effect a fine crosslinking which has been considered difficult in the use of an organic peroxide.

The crosslinking agent may be used directly as is is, but particularly in the case of a dihydroaromatic compound there may be adopted a method wherein the compound is prepared by a reaction during melt-kneading. The reaction may be selected optionally, but it is preferable that the reaction start from a compound which reacts easily on heating, in order to avoid the addition of catalyst, etc. Particularly, Diels-Alder reaction is preferred. In this case, however, it is desirable that the compound used be in the form of a dihydroaromatic compound.

The partially crosslinked composition used in the present invention is obtained by mixing the thermoplastic resin (A), rubbery substance (B) and crosslinking agent (C) and, if desired, polyfunctional monomer (D), in advance or at the time of heat treatment, and heat-treating the mixture dynamically.

The partially crosslinked composition obtained by the dynamic heat treatment indicates the composition obtained by melt-kneading the above mixture in which composition the boiling xylene insolubles content is increased as compared with that before the kneading.

As one criterion for judging the effect of the present invention there is mentioned such increase in boiling xylene insolubles content attained by the heat treatment.

Generally, the larger the increase in boiling xylene insolubles content, the greater the improvement in the effect of addition of the rubbery substance, including the improvement of impact resistance and tensile strength.

Such increase in boiling xylene insolubles content depends mainly on the amount of the crosslinking agent (C) added, which differs depending on the kind of the crosslinking agent used and of the activator used as well as melt-kneading apparatus and conditions. Actual amount of the crosslinking agent (C) to be used in the range of 0.001 to 5, preferably 0.05 to 3, parts by weight based on 100 parts by weight of the thermoplastic resin (A) and/or the rubbery substance (B).

If the amount of the crosslinking agent (C) is less than 0.001, the effect of crosslinking will be unsatisfactory, and if it exceeds 5 parts by weight, there will occur bleeding to the surface of the crosslinking agent, coloration and an increase of cost.

The temperature of the dynamic heat treatment is in the range of from the melting point or the softening point of the thermoplastic resin to below the decomposition point thereof. More specifically, it is preferred that the dynamic heat treatment be carried out at a temperature in the range of 120° to 350° C. for 20 seconds to 20 minutes.

In performing the melt-kneading operation using a dihydroaromatic compound, it is desirable to use a mixing machine which affords a high shear rate in order to facilitate the formation of radical in the mixture.

As a melt-kneading apparatus for carrying out the dynamic heat treatment there may be used any of conventional ones such as open type mixing rolls, non-open type Banbury mixer, extruder, kneader, and twin-screw extruder.

If desired, a polyfunctional monomer (D) may be used in an amount in the range from 0.001 to 5, preferably 0.05 to 3, parts by weight based on 100 parts by weight of the thermoplastic resin (A) and/or the rubbery substance (B).

As examples of the polyfunctional monomer (D) there are mentioned polyfunctional methacrylate monomers typified by trimethylolpropane trimethacrylate, ethylene glycol dimethacrylate, and diethylene glycon dimethacrylate; polyfunctional vinyl monomers typified by divinylbenzene, triallylisocyanurate, diallyl phthalate and vinyl butyrate; bismaleimides typified by N,N'-m-phenylene bismaleimide and N,N'-ethylene bismaleimide; and oximes such as p-quinone dixime.

In the case of using dihydroaromatic compounds as crosslinking agents, it is desirable for them to be combined with bismaleimides, because the effect of the dynamic heat treatment will be enhanced; besides, the addition of polar groups will lead to the improvement of dispersibility and acceptability of inorganic fillers such as metal oxides for example.

As the inorganic filler (E) in the invention there may be used any of known ones such as powdered, plate-like, flaky, needle-like, spherical, hollow, and fibrous ones. Concrete examples include powdered fillers such as calcium carbonate, magnesium carbonate, calcium sulfate, siliceous sand calcium, clay, diatomaceous earth, talc, alumina, glass powder, iron oxide, metal powder, graphite, silicon carbide, silicon nitride, silica, boron nitride, alumium nitride, and carbon black; metallic foils such as mica, glass plate, sericite, pyrophyllite, and alum flake; plate- or flake-like fillers such as graphite; hollow fillers such as Shirasu balloon, metal balloon and pumice; and mineral fibers such as glass fiber, carbon fiber, graphite fiber, whisker, metallic fiber, silicon carbide fiber, asbestos, and sollastonite.

These fillers may be used each alone or as mixtures. The kind and amount of the filler to be used may be determined according to purposes. For improving their dispersibility, the surfaces thereof may be treated with, for example, a silane coupling agent, an organotitanate-based coupling agent, or a metallic salt of a fatty acid.

The inorganic filler (E) may be added during and/or after the heat treatment in the whole amount or in a suitably divided manner. But for enhancing the compatibility between the resin composition and the inorganic filler it is desirable that the inorganic filler be melt-kneaded together with the other components at the time of the heat treatment.

The amount of the inorganic filler (E) to be used is in the range of 1 to 200, preferably 5 to 180, more preferably 10 to 150, parts by weight based on 100 parts by weight of the whole resin composition. If it is smaller than 1 part by weight, the effect of the addition of the inorganic filler will not satisfactory, and if it exceeds 200 parts by weight, the mechanical strength of the resulting composition will be deteriorated.

Although the composition used in the present invention is effective to some extent if only it contains the partially crosslinked product, it is desirable in point of physical properties that the inorganic filler be contained in the resin components at least 10 wt. %, preferably 20 wt. % or more, more preferably 30 wt. % or more.

If necessary, moreover, a softening agent may be added during and/or after the heat treatment. As the softening agent there may be used one commonly called extender oil which is used mainly for the purpose of improving the processability of rubber or for improving the extending effect or the dispersibility of filler.

Extender oils are high-boiling petroleum components, which are classified into paraffinic, naphtaenic and aromatic oils.

Not only such petroleum distillates but also synthetic oils such as liquid polyisobutene are employable in the present invention.

The amount of the softening agent used is in the range of 2 to 300, preferably 5 to 150, parts by weight based on the total resin weight. If it is smaller than 5 parts by weight, there will not be obtained any effect, and if it is exceeds 300 parts by weight, the strength and heat resistance will be deteriorated markedly.

The component (A) and/or the component (B) in the partially crosslinked product are not specially limited if only they are within the scope not departing from the gist of the invention.

The molded articles of thermoplastic resins to which the present invention is applicable include primary, intermediate and final molded articles obtained using the composition described above by means of, for example, extrusion, injection molding, rotational molding, compression molding, or blow molding, such as, for example, films, sheets, plates, filaments, non-woven fabrics, pipes, vessels, dolls, special shapes, household electric products, and automobilie parts such as bumper and instruments.

According to the surface treating and/or coating method of the present invention, a special ultraviolet light having a radiation wave length in the region not longer than 300 nm is radiated to a molded article to activate the surface of the molded article, thereby improving the adhesive property, printability and coatability of the surface.

The action of light applied to the surface of a molded article differs depending on the wave length of light, and the shorter the wave length, the more effective. It is desirable that the energy of light not longer than 300 nm, preferably shorter than 254 nm, in wave length occupy 85% or more of the entire energy. Ultraviolet light whose main operating wave length is near 185 nm is most preferable.

The material of an ultraviolet radiation lamp which produces an ultraviolet light having a main operating wave length near 185 nm is preferably one which is high in the transmissivity of ultraviolet rays of short wave lengths. This is attained by using a synthetic quartz glass whose purity is higher than that of natural quartz glass.

In the present invention, by using such an ultraviolet light of a short wave length, it is made possible to more activate the surface of a molded article and improve the coatability, adhesive property, etc.

At the time of radiating such ultraviolet light to the surface of a molded article, the surface may be treated with a solvent at room temperature or with a heated solvent, or the molded article may be heated and then treated with a solvent.

Into the composition used in the present invention there may be incorporated additives within the range not affecting the object of the present invention. Examples of such additives include antioxidants, heat stabilizers (e.g. hindered phenol, phosphite, hydroquinone and thioether compounds), ultraviolet ray absorbers (e.g. benzotriazole, resorcinol and salicylate compounds), dyes or pigments, flame-retardants, antistatic agents, nucleating agents (crystallization accelerating agents), lubricants, foaming agents, crosslinking accelerators, and mold release agents. Several of these additives may be used in combination.

By suitably selecting the components of the composition used in the invention and the surface treating and/or coating method for the composition, the resulting molded articles, for example automobile parts such as interior parts, e.g. instruments, trims, and pillars, and exterior parts, e.g. bumper and fascia, as well as household electric products, can be remarkably improved in coatability, printability and adhesive property.

In the case of using a dihydroaromatic compound as a crosslinking agent, it is presumed that the compound acts on the carbon-hydrogen bond of the thermoplastic resin and forms carbon radical, and per se exhibits a resonant structure after release of the radical and is stabilized. Since the carbon radical formed is weak in its hydrogen withdrawing ability from the carbon-hydrogen bond as compared with oxygen radical formed by the cleavage of an organic peroxide as described above, an extreme degradation reaction is not exhibited even for a peroxide decomposing type thermoplastic resin such as polypropylene, nor is exhibited an extreme crosslinking reaction even for a peroxide crosslinking type thermoplastic resin such as polyethylene. Thus, the reaction control is easy and hence it is possible to effect a fine crosslinking which has heretofore been considered difficult in the use of an organic peroxide.

In the present invention, by using such crosslinking agent, or if desired, by using such crosslinking agent and a polyfunctional monomer, together with the other components, it is made possible to enhance the compatibility between the resin composition and the inorganic filler and remarkably improve mechanical characteristics which have been poor in the conventional inorganic filler-incorporated thermoplastic resin compositions, and further possible to greatly improve such physical properties as heat resistance, impact resistance and rigidity in comparison with a conventional composition prepared by mere blending of polypropylene with ethylene-propylene copolymer rubber.

The following examples are given to illustrate the present invention more concretely, but it is to be understood that the invention is not limited thereby.

EXAMPLES 1-13 AND COMPARATIVE EXAMPLES 1-3

Thermoplastic resins (A), rubbery substances (B), inorganic fillers (E), crosslinking agent (C) and polyfunctional monomer (D) were mixed as shown in Table 1. Test pieces were prepared by injection-molding the resulting compositions followed by annealing, unless otherwise described.

How to prepare the compositions, conditions for preparing the test pieces by injection molding, and testing methods, are as follows.

Each plate (3 mm thick, 100×200 mm) obtained by injection molding was placed in front of an ultraviolet light radiating device equipped with low-pressure mercury vapor lamp (SUV-110, a product of Sen Tokushu Kogen K. K.), and then ultraviolet light was radiated thereto in an air atmosphere for 5 minutes while the distance between the light source and the molded plate surface was kept 5 cm. (The low-pressure mercury vapor lamp had been fabricated using a synthetic quartz having a light transmissivity at a wave length of 185 nm of not less than 85%.)

The thus surface-treated plate was coated with an acrylic coating material (manufactured by Shinto Toryo K. K.) by spraying. The resulting coating was dried for 24 hours or longer at room temperature and then cross-cut into 2 mm width. Cellophane tape was brought into pressure contact with the upper surface of the coating and then peeled off. The remaining area was regarded as adhesive property. The results obtained as set forth in Tables 1 and 2.

How to Prepare Compositions

1) Thermoplastic resin (A), rubbery substance (B), inorganic filler (E), crosslinking agent (C) and polyfunctional monomer (D) were mixed in the tabulated proportions by means of Henschel mixer.

2) The resulting mixture was melt-kneaded at a resin temperature of 180° to 260° C., a revolution of 200 rpm, using a continuous twin-screw kneader/extruder.

Conditions for Injection Molding

Molding Machine: IS-90B (a product of Toshiba Machine Co., Ltd.)
Injection Pressure: 1,000 kg/cm$^2$
Molding Temperature: 180°-260° C.
Mold Temperature: 50° C.

Testing and Measuring Methods (Tensile Yield Strength) and (Tensile Breaking Elongation)
According to JIS K6760, JIS K6758 and JIS K7113.
(Heat Deformation Temperature)
According to JIS K7207 at a load of 4.6 kg.
(Flexural Modulus)
According to JIS K6758 and JIS K7203.
(Izod Impact Value)
According to JIS K6758 and JIS K7110.
(Boiling Xylene Insolubles Content)
A 20 mm×50 mm×0.2 mm film was formed by pressing and placed in a 120-mesh gauze, which was then immersed in boiling xylene for 5 hours. The weight before the immersion and that after the immersion were measured and there was determined a boiling xylene insolubles content from the following equation:

Boiling xylene insolubles content(wt %) =

$$\frac{\text{Film weight (g) after immersion in boiling xylene}}{\text{Film weight (g) before immersion in boiling xylene}} \times 100$$

The following thermoplastic resins, inorganic fillers, crosslinking agent and polyfunctional monomers were used.
(A) Thermoplastic Resin:
(A$_1$) Polypropylene (1) (trade name: Nisseki Polypro J650G, MFR=8.0, a product of Nippon Petrochemicals Co., Ltd.)
(A$_2$) Polypropylene (2) (trade name: Nisseki Polypro J150G, MFR=8.0, a product of Nippon Petrochemicals Co., Ltd.)
(B$_1$) Ethylene-Propylene-Diene random copolymer rubber (1) (trade name: EP57P, a product of Japan Synthetic Rubber Co., Ltd.)
(B$_2$) Ethylene-Propylene random copolymer rubber (1) (trade name: EP02P, a product of Japan Synthetic Rubber Co., Ltd.)
Crosslinking Agent:
(C$_1$) Poly(2,2,4-trimethyl-1,2-dihydroquinoline) (trade name: Nocrac 224S, a product of Ohuchi Shinko Kagaku K. K.)
Polyfunctional Monomer:
(D$_1$) N,N'-m-phenylene bismaleimide (trade name: Vulnoc PM, a product of Ohuchi Shinko Kagaku K. K.)
Inorganic Filler:
(E1) Talc
(E2) Calcium carbonate
(E3) Barium sulfate
(E4) Mica

| | Composition | | | | | | | | | | Physical Properties | | | |
|---|---|---|---|---|---|---|---|---|---|---|---|---|---|---|---|
| | Component (A) | | Component (B) | | Component (C) | | Component (D) | | Component (E) | | Tensile Breaking Elongation | Flexural Modulus | Heat Deformation Temperature (4.6 kgf) | Izod Impact Value (notched) −30° C. | Boiling Xylene Insolubles Content |
| Composition | Kind | (wt %) | Kind | (wt %) | Kind | (wt %) | Kind | (part) | Kind | (part) | (%) | kgf/cm² | °C. | | wt % |
| 1 | A1 | 70 | B1 | 30 | | | C1 | 0.50 | D1 | 0.50 | >500 | 7,200 | 87 | 15.0 | 28.5 |
| 2 | A1 | 70 | B2 | 30 | | | C1 | 0.50 | D1 | 0.50 | >500 | 7,500 | 87 | 12.5 | 17.2 |
| 3 | A2 | 70 | B1 | 30 | | | C1 | 0.50 | D1 | 0.50 | >500 | 8,800 | 94 | 9.0 | 27.1 |
| 4 | A1 | 70 | B1 | 20 | E1 | 10 | C1 | 0.50 | D1 | 0.50 | >500 | 15,600 | 115 | 10.0 | 17.2 |
| 5 | A1 | 60 | B1 | 20 | E1 | 20 | C1 | 0.50 | D1 | 0.50 | 210 | 16,400 | 118 | 9.2 | 38.7 |
| 6 | A1 | 40 | B1 | 40 | E1 | 20 | C1 | 0.50 | D1 | 0.50 | 280 | 7,600 | 86 | N.B. | 55.4 |
| 7 | A2 | 60 | B1 | 20 | E1 | 20 | C1 | 0.50 | D1 | 0.50 | 190 | 22,000 | 125 | 6.1 | 38.5 |
| 8 | A1 | 60 | B2 | 20 | E1 | 20 | C1 | 0.50 | D1 | 0.50 | 180 | 17,000 | 117 | 7.0 | 29.4 |
| 9 | A1 | 60 | B1 | 20 | E2 | 20 | C1 | 0.50 | D1 | 0.50 | 200 | 12,000 | 106 | 12.3 | 37.9 |
| 10 | A1 | 60 | B1 | 20 | E3 | 20 | C1 | 0.50 | D1 | 0.50 | 210 | 10,500 | 100 | 17.2 | 38.0 |
| 11 | A1 | 60 | B1 | 20 | E4 | 20 | C1 | 0.50 | D1 | 0.50 | 170 | 20,500 | 124 | 6.8 | 39.1 |
| 12 | A1 | 70 | B1 | 30 | | | C1 | 0 | E1 | 0 | >500 | 7,500 | 84 | 9.6 | 0.2 |
| 13 | A1 | 60 | B1 | 20 | E1 | 20 | C1 | 0 | E1 | 0 | 130 | 17,100 | 111 | 4.3 | 21.2 |

A1: PP (J650G)
A2: PP (J150G)
B1: EPDM (EP57P)
B2: EPR (EP07P)

| Table 2 | | | | |
|---|---|---|---|---|
| | | Radiation Time | Radiation Distance | Adhesion |
| Example | Composition | Material (min) | (cm) | (%) |
| 1 | 1 | 5 | 5 | 100 |
| 2 | 1 | 3 | 5 | 100 |
| 3 | 1 | 10 | 10 | 100 |
| 4 | 2 | 5 | 5 | 100 |
| 5 | 3 | 5 | 5 | 100 |
| 6 | 4 | 5 | 5 | 100 |
| 7 | 5 | 5 | 5 | 100 |
| 8 | 6 | 5 | 5 | 100 |
| 9 | 7 | 5 | 5 | 100 |
| 10 | 8 | 5 | 5 | 100 |
| 11 | 9 | 5 | 5 | 100 |
| 12 | 10 | 5 | 5 | 100 |
| 13 | 11 | 5 | 5 | 100 |
| Comparative Example 1 | 1 | 0 | — | 0 |
| Comparative Example 2 | 12 | 5 | 5 | 66 |
| Comparative Example 3 | 13 | 5 | 5 | 55 |

E1: talc
E2: calcium carbonate
E3: barium sulfate
E4: mica
C1: crosslinking agent (224S)
D1: polyfunctional monomer (PM)

What is claimed is:

1. A method of surface treating and coating a molded article comprising the steps of:
   forming a resin composition by combining an α-olefin copolymer having 2 to 10 carbon atoms, a rubbery substance and mixtures thereof; a crosslinking agent; and, optionally, a polyfunctional monomer;
   dynamically heat treating said resin composition whereby a partially crosslinked resin composition is formed;
   molding said partially crosslinked resin composition to form a partially crosslinked resin molded article;
   activating the surface of said molded article by exposing said molded article to the radiation provided by ultraviolet light having a wavelength of no more than 300 nm; and
   coating said activated surface of said molded article.

2. A method of surface treating and coating a molded article comprising the steps of:
   forming a resin composition by combining an α-olefin copolymer having 2 to 10 carbon atoms, a rubbery substance and mixtures thereof; a crosslinking agent; and, optionally, a polyfunctional monomer;
   combining 100 parts by weight of said resin composition with between 1 and 200 parts by weight of an inorganic filler whereby a filled resin composition is formed;
   dynamically heat treating said filled resin composition whereby a filled, partially crosslinked resin composition is formed;
   molding said filled, partially crosslinked resin composition to form a filled, partially crosslinked resin molded article;
   activating the surface of said molded article by exposing said article to the radiation provided by ultraviolet light having a wavelength of no more than 300 nm; and
   coating said activated surface of said molded article.

3. A method as set forth in claim 2 wherein the rubbery substance is an ethylene-propylene random copolymer rubber or an ethylene-propylene-diene random copolymer rubber.

4. A method as set forth in claim 3 wherein the crosslinking agent is a dihydroaromatic compound.

5. A method as set forth in claim 4 wherein the dihydroaromatic compound is at least one member selected from the group consisting of a 1,2-dihydroquinoline compound and a 9,10-dihydrophenanthrene.

6. A method as set forth in claim 1 wherein the crosslinking agent is a dihydroaromatic compound.

7. A method as set forth in claim 6 wherein the dihydroaromatic compound is at least one member selected from the group consisting of a 1,2-dihydroquinoline compound and a 9,10-dihydrophenanthrene.

* * * * *